(12) United States Patent
Anschicks et al.

(10) Patent No.: US 7,198,252 B2
(45) Date of Patent: Apr. 3, 2007

(54) HOUSING FLANGE UNIT

(75) Inventors: Rolf Anschicks, Butzbach (DE); Jörg Krüger, Kelkheim (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/113,008

(22) Filed: Apr. 25, 2005

(65) Prior Publication Data

US 2005/0236598 A1    Oct. 27, 2005

Related U.S. Application Data

(63) Continuation of application No. PCT/DE03/03183, filed on Sep. 24, 2003.

(30) Foreign Application Priority Data

Oct. 31, 2002    (DE) ................ 102 51 179

(51) Int. Cl.
*F16K 1/22* (2006.01)
(52) U.S. Cl. ..................... 251/214; 251/305
(58) Field of Classification Search ........ 251/305–308, 251/214
See application file for complete search history.

(56) References Cited

U.S. PATENT DOCUMENTS

| | | | | |
|---|---|---|---|---|
| 3,991,974 A * | 11/1976 | Bonafous | ................ | 251/306 |
| 4,022,424 A * | 5/1977 | Davis et al. | ................ | 251/305 |
| 4,981,284 A * | 1/1991 | Imamura et al. | ............. | 251/305 |
| 5,016,586 A | 5/1991 | Imamura et al. | | |
| 5,277,026 A | 1/1994 | Boll et al. | | |
| 5,630,571 A * | 5/1997 | Kipp et al. | ................ | 251/305 |
| 5,687,691 A * | 11/1997 | Kaiser et al. | ................ | 251/305 |
| 5,839,717 A * | 11/1998 | Feigel | ................ | 251/305 |
| 5,953,898 A | 9/1999 | Dryden | | |
| 6,022,000 A * | 2/2000 | Laulhe et al. | ............. | 251/306 |
| 6,035,628 A | 3/2000 | Dryden | | |
| 6,595,488 B2 * | 7/2003 | Zwick | ................ | 251/306 |
| 6,769,247 B2 * | 8/2004 | Watanabe et al. | ........... | 251/214 |

FOREIGN PATENT DOCUMENTS

| | | |
|---|---|---|
| AT | 142057 | 6/1935 |
| DE | 922 800 | 1/1955 |

(Continued)

OTHER PUBLICATIONS

Derwent Abstract—DE 44 13 145 C2 Oct. 19, 1995 DaimlerChrysler Aktiengesellschaft, 70567 Stuttgart, Germany.

(Continued)

*Primary Examiner*—John Bastianelli

(57) ABSTRACT

The present invention is directed to a housing flange unit which includes a housing flange wherein a butterfly valve shaft is rotatably mounted in a perpendicular position in relation to the longitudinal axis of the housing flange and includes a butterfly valve which is arranged in the middle and provided with a first bearing and a second bearing. The butterfly valve shaft includes a circular disk on the outside of the first bearing. The disk engages with a cup-shaped seat of the housing flange. A pot-shaped element with a circular recess is fixed in the cup-shaped seat. The circular disk is embedded in the pot-shaped element. The invention also relates to the use of the housing flange unit as a sealing unit.

5 Claims, 2 Drawing Sheets

FOREIGN PATENT DOCUMENTS

| DE | 37 07 904 A1 | 9/1988 |
|---|---|---|
| DE | 39 39 198 A1 | 5/1990 |
| DE | 40 19 264 A1 | 12/1991 |
| DE | 42 05 496 C1 | 1/1993 |
| DE | 44 13 145 C2 | 10/1995 |
| DE | 697 09 521 T2 | 4/1998 |
| DE | 698 07 458 T2 | 2/2000 |
| DE | 100 45 109 A1 | 3/2002 |
| DE | 101 42 411 A1 | 4/2003 |
| JP | 10019140 A | 1/1998 |

OTHER PUBLICATIONS

Derwent Abstract—DE 42 05 496 C1 Jan. 28, 1993 Mercedes-Benz Aktiengesellschaft, 7000 Stuttgart, Germany.

Derwent Abstract—DE 101 42 411 A1 Apr. 3, 2003 Siemens Aktiengesellschaft, 80333 München, Germany.

Derwent Abstract—DE 100 45 109 A1 Mar. 21, 2002 Schuth, Horst, Ing., 51503 Rösrath, Germany.

Derwent Abstract—DE 39 39 198 A1 May 31, 1990 Hitachi, Ltd., Tokyo, Japan.

Derwent Abstract—DE 698 07 458 T2 Feb. 9, 2000 Foster Wheeler Energia OY, Helsinki, FI.

Derwent Abstract—DE 697 09 521 T2 Apr. 15, 1998 ECIA—Equipements et Composants pour l'Industrie Automobile, Audincourt, France.

Abstract—AT 142057 Jun. 11, 1935 "Befa" Beteiligungs- und Finanzierungsaktiengesellschaft, Glarus, Switzerland.

Abstract—DE 922 800 Jan. 24, 1955 Klöckner-Humboldt-Deutz Aktiengesellschaft, Köln, Germany.

Derwent Abstract—DE 37 07 904 A1 Sep. 22, 1988 Süddeutsche Kühlerfabrik Julius Fr. Behr GmbH & Co. KG, 7000 Stuttgart, Germany.

Derwent Abstract—DE 40 19 264 A1 Dec. 19, 1991 VDO Adolf Schindling Aktiengesellschaft, 6000 Frankfurt, Germany.

* cited by examiner

HOUSING FLANGE UNIT

CROSS REFERENCE TO RELATED APPLICATIONS

The present application is a continuation of International Application serial no.: PCT/DE03/03183, filed Sep. 24, 2003, which designated the United States, and further claims priority to German patent application 10251179.9, filed Oct. 31, 2002, the both of which are herein incorporated by reference.

BACKGROUND OF THE INVENTION

The invention relates to a housing flange unit and to a use of the housing flange unit.

Housing flange units are known. They generally have gases flowing through them and are of multi-part construction. They generally have a butterfly valve shaft which is mounted rotatably perpendicularly with respect to the longitudinal axis of the housing flange and on which a butterfly valve for closing pipeline units is arranged. In this case, it is generally desirable that the gases cannot pass into the open air via the bearings of the butterfly valve shaft, particularly if the gases contain harmful substances. This possibility is provided by the fact that the butterfly valve shaft is generally driven externally and, as a consequence of high temperatures to which the housing flange unit is generally exposed, appropriate sealing by means of sealing rings cannot be effectively realized.

SUMMARY OF THE INVENTION

The invention is therefore based on the object of providing a housing flange unit by means of which an escape of the flowing medium through the butterfly valve shaft mounting can be effectively avoided even at relatively high operating temperatures.

The object on which the invention is based is achieved by a housing flange unit which comprises a housing flange in which a butterfly valve shaft having a centrally arranged butterfly valve with a first bearing and a second bearing is mounted rotatably perpendicularly with respect to the longitudinal axis of the housing flange and has, on the outside of the first bearing, a circular disk which engages in a cup-shaped seat of the housing flange, in which seat is fixed a pot-shaped element having a circular recess, in which the circular disk is embedded. For example, a circular metal disk is used as the butterfly valve. The first bearing and the second bearing are particularly advantageously bearing sleeves. The longitudinal axis of the circular disk runs perpendicularly with respect to the longitudinal axis of the butterfly valve shaft. In this case, the circular disk can be connected to the butterfly valve shaft by welding, for example. However, it is also possible for the circular disk to be designed as a projection of the butterfly valve shaft and for it therefore to form an individual part together with the butterfly valve shaft. The cup-shaped seat of the housing flange is of circular design, for example. In this case, the pot-shaped element consists of a round solid material which is recessed in an appropriate shape on its side facing the center of the housing flange, so that the circular disk can be completely embedded in the recess. It has surprisingly been shown that an escape of the flowing medium from the housing flange unit can be avoided even at relatively high operating temperatures. The arrangement of additional seals can be omitted here. The flowing media, for example gases, possibly still pass via the first bearing to the circular disk which engages in a cup-shaped seat of the housing flange. This engagement makes it impossible for the flowing media to pass to the outside via the circular disk and the pot-shaped element.

One preferred refinement of the invention is for that end of the butterfly valve shaft which is positioned on the first bearing to be connected to an actuator. This makes it possible for the butterfly valve shaft to be particularly advantageously caused to rotate, with it being ensured at the same time that no flowing media can pass into the open air.

The invention finally relates to the use of the housing flange unit as a sealing unit for a gas cooler having an internal passage, the internal dimensions of which coincide with the external dimensions of the butterfly valve with tolerances being complied with. In this case, the tolerances have to be selected in such a manner that the internal passage can be closed in a gastight manner by means of the butterfly valve. Gas coolers of this type generally have, in addition to the internal passage, a plurality of external passages for the medium which is to flow. In contrast to the internal passage, the external passages of the gas cooler are cooled. By setting various positions of the butterfly valve, the throughput of the inflowing medium can be appropriately distributed to the external passages or to the internal passage. The flowing media are conducted through the internal passage if it is desired for them to maintain their relatively high temperatures. If, by contrast, the flowing media are to be cooled down, then it is required to largely close the internal passage of the gas cooler by the butterfly valve and thus to conduct the flowing media virtually completely through the external passages.

One particular refinement is the use of the housing flange unit as a sealing unit for a gas cooler for exhaust gases of a motor vehicle. It is precisely in the case of a motor vehicle's exhaust gases that it is desirable for the exhaust gases not to pass into the open air through the mounting of the butterfly valve shaft. Furthermore, it is desirable to keep part of the exhaust gases at a higher temperature. The division of the exhaust gas flow can be simply realized in a particularly advantageous manner by means of the housing flange unit, with an escape of the exhaust gases from the housing flange unit being avoided.

BRIEF DESCRIPTION OF THE SEVERAL VIEWS OF THE DRAWINGS

The invention is explained in more detail and by way of example below with reference to the drawing (FIG. 1, FIG. 2).

DETAILED DESCRIPTION OF THE INVENTION

Figure 1:
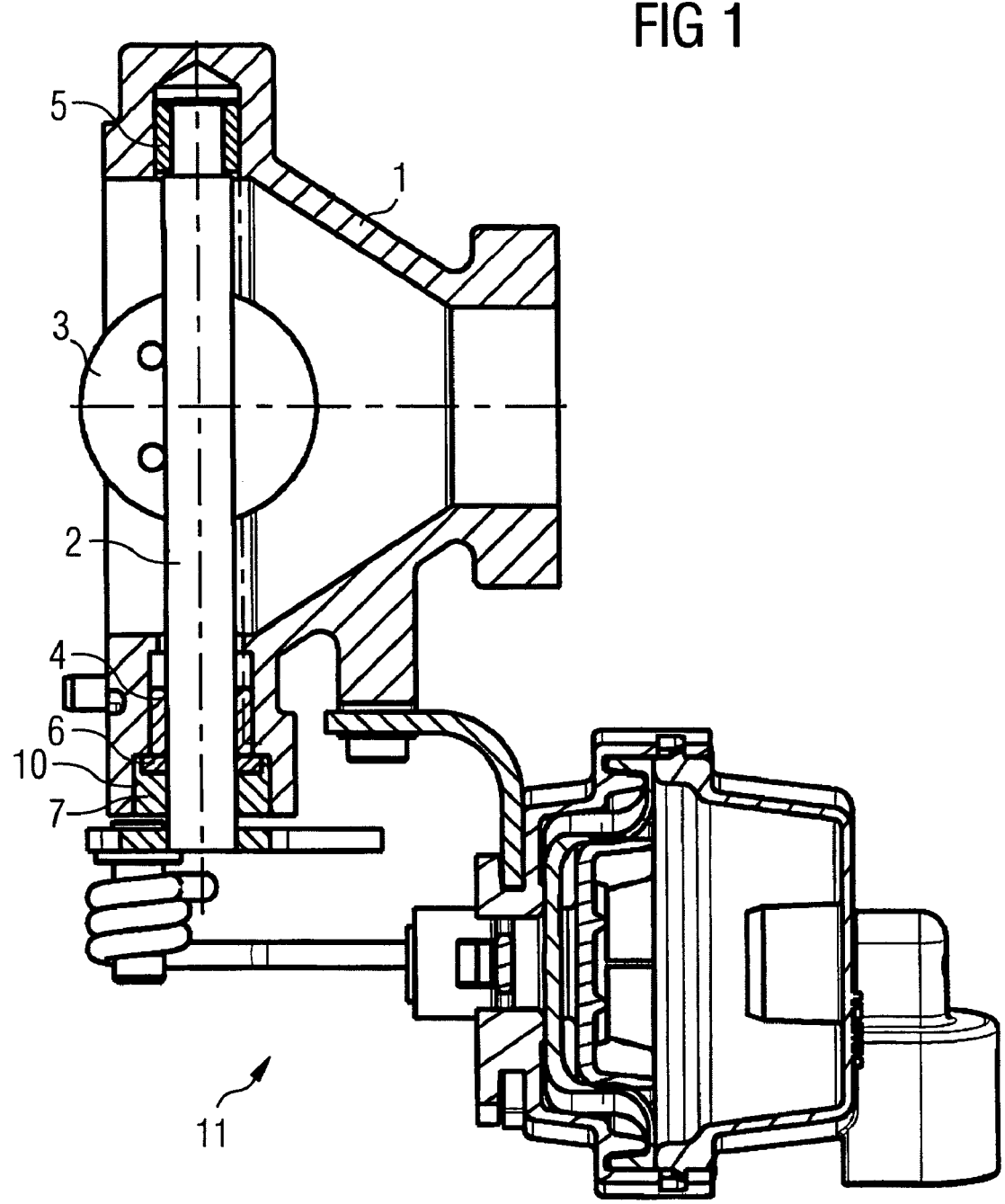
FIG. 1 shows the housing flange unit in cross section together with the actuator.

FIG. 1 illustrates the housing flange unit together with the actuator 11 in cross section. The housing flange unit comprises a housing flange 1 in which a butterfly valve shaft 2 having a centrally arranged butterfly valve 3 with a first bearing 4 and a second bearing 5 is mounted rotatably perpendicularly with respect to the longitudinal axis of the housing flange 1. The first bearing 4 and the second bearing 5 are bearing sleeves. The butterfly valve shaft 2 has, on the outside of the first bearing 4, a circular disk 6 which is fixedly connected to the butterfly valve shaft 2. In this case, the connection can take place by means of welding, for example. The circular disk 6 engages in a cup-shaped seat 10 of the housing flange 1. A pot-shaped element 7 having a circular recess is fixed in the cup-shaped seat 10. The circular disk 6 is embedded in this circular recess. This construction stops flowing media, for example gases, from being able to pass into the open air via the first bearing 4 and the butterfly valve shaft 2. That end of the butterfly valve shaft 2 which is positioned on the first bearing 4 is connected to an actuator 11. The actuator 11 enables the butterfly valve shaft 2 to be caused to rotate and the butterfly valve 3 to be changed in its position in a corresponding manner.

Figure 2:
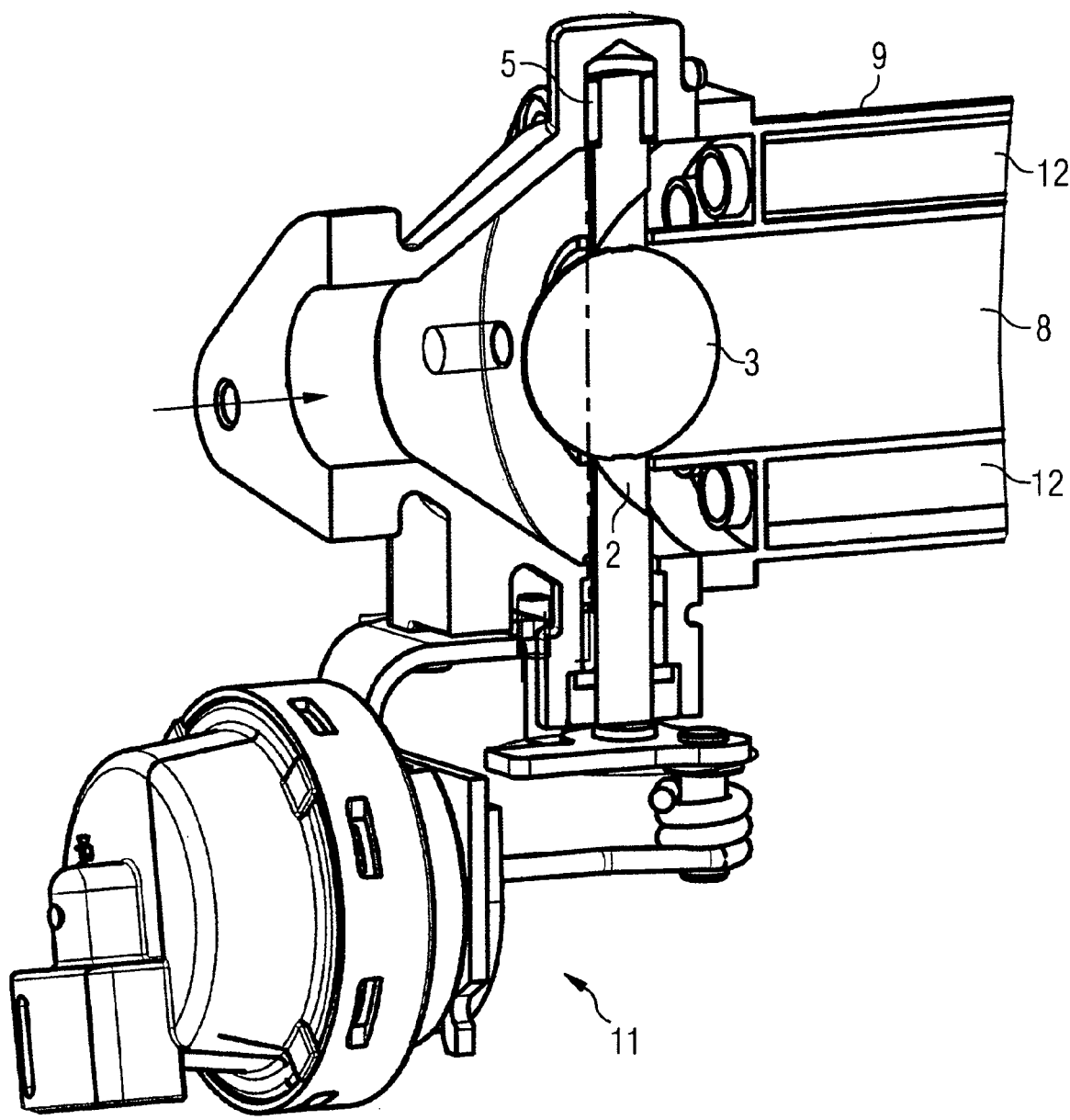
FIG. 2 shows the perspective illustration of the housing flange unit with the gas cooler connected.

FIG. 2 illustrates the housing flange unit in a perspective illustration with a gas cooler 9 connected. The gas cooler 9 has an internal passage 8 and external passages 12. In this case, the housing flange unit serves as a sealing unit for the gas cooler with respect to its internal passage 8. The internal dimensions of the internal passage 8 coincide with the external dimensions of the butterfly valve 3 with tolerances being complied with, so that the internal passage 8 of the gas cooler 9 can be completely closed by the butterfly valve 3. In this case (not illustrated), the flowing media, which are introduced into the housing flange unit in the arrow direction, are conducted into the external passages 12, which are generally flushed with cooling water and can therefore cool the flowing media. If it is intended to keep most of the flowing media at a relatively high temperature level, the butterfly valve 3 is to be correspondingly opened, and most of the flowing media is conducted through the internal passage 8 of the gas cooler 9. The housing flange unit is suitable in particular as a sealing unit for a gas cooler 9 for exhaust gases of a motor vehicle.

We claim:

1. A housing flange unit, comprising:
   a housing flange comprising a longitudinal axis;
   a butterfly valve shalt rotatably mounted perpendicularly with respect to the longitudinal axis via a first and second bearing;
   a butterfly valve centrally arranged about the shaft;
   a cup shaped seat arranged proximate to the first bearing, the seat comprising a pot-shaped element having a circular recess having an inner diameter and a depth; and
   a circular disk having an outer diameter and a height and arranged outside the first bearing so as to engage the circular recess and the butterfly valve shaft, wherein the inner diameter and the depth of the circular recess and the outer diameter and the height of the circular disk are selected so that the circular disk is completely embedded in the recess.

2. The housing flange unit according to claim 1, further comprising an actuator connected to a butterfly valve shaft end by the first bearing.

3. A gas cooler comprising:
   an internal passage for transporting gas,
   a housing flange comprising a longitudinal axis;
   a butterfly valve shaft rotatably mounted perpendicularly with respect to the longitudinal axis via a fist and second bearing;
   a butterfly valve centrally arranged about the shaft and within the passage;
   a cup shaped seat arranged proximate to the first bearing, the seat comprising a pot-shaped element having a circular recess having an inner diameter and a depth; and
   a circular disk having an outer diameter and a height and arranged outside the first bearing so as to engage the circular recess and the butterfly valve shaft, wherein the inner diameter and the depth of the circular recess and the outer diameter and the height of the circular disk are selected so that the circular disk is completely embedded in the recess.

4. The gas cooler according to claim 3, wherein the gas is a motor vehicle exhaust gas.

5. The gas cooler according to claim 3, further comprising an actuator connected to a butterfly valve shaft end by the first bearing.

* * * * *